(12) United States Patent
Olavson (10) Patent No.: US 7,693,801 B2
(45) Date of Patent: Apr. 6, 2010

(54) METHOD AND SYSTEM FOR FORECASTING COMMODITY PRICES USING CAPACITY UTILIZATION DATA

(75) Inventor: Thomas Olavson, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1120 days.

(21) Appl. No.: 10/831,591

(22) Filed: Apr. 22, 2004

(65) Prior Publication Data

US 2005/0240539 A1    Oct. 27, 2005

(51) Int. Cl.
*G06Q 99/00* (2006.01)
(52) U.S. Cl. .......................... 705/400; 705/1
(58) Field of Classification Search ................ 705/10, 705/35, 7, 400, 1
See application file for complete search history.

(56) References Cited

U.S. PATENT DOCUMENTS

| | | | | |
|---|---|---|---|---|
| 6,061,691 | A | | 5/2000 | Fox |
| 6,151,582 | A | * | 11/2000 | Huang et al. ................ 705/8 |
| 6,253,187 | B1 | | 6/2001 | Fox |
| 6,526,392 | B1 | * | 2/2003 | Dietrich et al. ............. 705/400 |
| 6,567,824 | B2 | | 5/2003 | Fox |
| 2002/0002517 | A1 | | 1/2002 | Fox |
| 2002/0152111 | A1 | * | 10/2002 | Cox et al. .................... 705/10 |
| 2002/0188487 | A1 | * | 12/2002 | Fox ................................. 705/7 |
| 2003/0154142 | A1 | | 8/2003 | Ginsburg et al. |
| 2003/0225654 | A1 | * | 12/2003 | Chavas et al. ................ 705/36 |
| 2004/0128261 | A1 | * | 7/2004 | Olavson et al. ............. 705/400 |

\* cited by examiner

*Primary Examiner*—Akiba K Robinson Boyce (57) ABSTRACT

The present invention includes a method and system for creating a price-forecasting tool for a commodity. The method and system comprise providing price data and industry capacity utilization data related to the commodity, and establishing the price-forecasting tool based on a statistical relationship between the price data and the industry capacity utilization data. A method of doing business is disclosed comprising creating a price forecasting tool based on a statistical relationship between price data and industry capacity utilization data of the commodity, and utilizing the price forecasting tool to generate a plurality of scenario prices for the commodity for a plurality of forecast horizons. A computer program product is disclosed for creating a price forecasting tool comprising a computer usable medium having computer readable program means for causing a computer to perform the steps of providing price data and industry capacity utilization data related to the commodity, and establishing the price forecasting tool based on a statistical relationship between the price data and the industry capacity utilization data.

38 Claims, 5 Drawing Sheets

Forecast horizon (months)

METHOD AND SYSTEM FOR FORECASTING COMMODITY PRICES USING CAPACITY UTILIZATION DATA

BACKGROUND OF THE INVENTION

The present invention relates generally to price modeling and particularly to a method and system for creating a price-forecasting tool.

In today's financial markets, the use of financial instruments known as "derivatives" have exponentially grown and is now common-place. A derivative is an investment vehicle with a value that is based on the value of another security or underlying asset. That is, a derivative is essentially a financial instrument that is derived from the future movement of something that cannot be predicted with certainty. By the late 1990's the Office of the Comptroller of the Currency estimates that commercial banks in the United States alone, held over twenty trillion dollars worth of derivative-based assets. Common examples of derivatives include futures contracts, forward contracts, options, and swaps.

The relationship between the value of a derivative and the underlying asset is not linear and can be very complex. Economists have developed pricing models in order to valuate certain types of derivatives. At the core of various derivative-pricing models are assumptions about how the price of the underlying asset (like a stock) may change over time. These pricing models provide probability distributions that describe the possible states of prices at different points in the future. Prices are generally modeled as a stochastic process, in which the values change over time in an uncertain manner. A particular type of stochastic process is the Markov process, where only the present state of the process (e.g., the current stock price) is relevant for predicting the future. The past history of the process is irrelevant.

A particular type of Markov process typically used to model prices is geometric Brownian motion (GBM). GBM, which is the basis of the vast majority of derivative pricing models, makes two key assumptions:

1. Price changes over small time intervals are independent, and therefore longer-term forecasts can be generated by repeatedly simulating small incremental changes in prices.
2. The distribution of future predicted prices is log-normal (LN).

While there are many variations on the GBM approach to modeling asset or commodity prices, they all are fundamentally constrained by the two assumptions listed above. Consequently, while these approaches to modeling price may fit well in efficient, exchange-traded markets, they do not fit well in markets for commodities that are not traded on exchanges. Such markets are typically dominated by a handful of big buyers and big suppliers who negotiate prices directly. These markets tend to move not in a random fashion, as the "small independent intervals" assumption would suggest, but rather in cycles lasting from 6 months to several years. Within each cycle, periodically negotiated contract prices continue on a rising or falling trend, without deviation, until the market suddenly "turns" and prices head in the other direction. Therefore, the assumption that price changes over different horizons can all be modeled using the same model of changes over small, independent intervals is not good.

A co-pending patent application entitled "A Method and System For Creating A Price Forecasting Tool," naming the applicant as a co-inventor (HPP number 200206487-1) (referred to herein as the "Co-pending Patent Application") provides a method and system for forecasting prices of commodities by building a statistical model of price forecasts for each desired forecast horizon. The method of the Co-pending Patent Application involves first receiving historical data related to a commodity, defining a long-run average price trend based on the received historical data and creating a price forecasting tool based on the long-run average price trend. The price forecasting tool is capable of taking into account a market momentum of the commodity in order to generate a plurality of scenario prices of the commodity for a plurality of forecast horizons.

Although the Co-pending Patent Application provides a way to forecast pricing using price trends and short-term price momentum, other factors are involved in the complex market milieu that should be considered in order to more finely tune the price-forecasting method and system to reduce error. Accordingly, what is needed is a method and system for forecasting future commodity pricing that includes important market variables besides pricing. The method and system should be simple, cost effective and capable of being easily adapted to existing technology. The present invention addresses these needs.

SUMMARY OF THE INVENTION

A first embodiment of the present invention is directed to a method and system for creating a price-forecasting tool for a commodity. The method and system comprise providing price data and industry capacity utilization data related to the commodity and establishing the price forecasting tool based on a statistical relationship between the price data and the industry capacity utilization data.

Another aspect of the present invention is concerned with a method of doing business comprising creating a price forecasting tool based on a statistical relationship between price data and industry capacity utilization data of the commodity, and utilizing the price forecasting tool to generate a plurality of scenario prices for the commodity for a plurality of forecast horizons.

A further aspect of the present invention is a computer program product for creating a price forecasting tool. The computer program product comprises a computer usable medium having computer readable program means for causing a computer to perform the steps of providing price data and industry capacity utilization data related to the commodity and establishing a price forecasting tool based on a statistical relationship between the price data and the industry capacity utilization data.

Other aspects and advantages of the present invention will become apparent from the following detailed description, taken in conjunction with the accompanying drawings, illustrating by way of example the principles of the invention.

DETAILED DESCRIPTION

The present invention relates to a method and system for enhancing the price forecasting tool described in the co-pending patent application by including capacity utilization data of the relevant industry in forecasting prices. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

Model Development

The disclosure of the Co-pending Patent Application is incorporated herein, in its entirety. The method and system of the prior Co-pending Patent Application developed a separate statistical model for each forecast horizon, rather than developing a single period model that is run through simulations to develop longer term forecast distributions. Consequently, the method and system in accordance with the prior Co-pending Patent Application are particularly well suited to commodities that show both strong momentum in the short-term (rising or falling price trends persist until a sudden market turn) and reversion to a trend line in the long-term (long-run average price follows a predictable declining trend based on rate of cost reduction from incremental technological progress).

The method and system of the Co-pending Patent Application uses two predictors: current price and price in a previous period or previous periods (price trend). Regression analysis is performed to determine the relationship between these two predictors. Linear regression is a statistical technique to determine the relationship between variables by fitting a straight line to a set of data points. It has been determined that these predictors have a logarithmic relationship. Thus, the relevant data is transformed into a line that best shows the logarithmic relation between the variables. This relationship is shown by the following equations:

$$z(t) = LN[price(t)/trend\ price(t)], \text{ or} \quad (1)$$

$$z(t) = LN[(price(t)] - LN[trend\ price(t)] \quad (2)$$

where LN denotes the natural log function, price(t) is the current price and trend price(t) is the price in one or more previous periods.

The above equations are a convenient form to account for mean-reversion effects and the assumption that the price distribution follows a log-normal (LN) distribution. Accordingly, the model variables are formulated in terms of z(t), which is the deviation of LN(price) from LN(long-run price trend).

A long-run trend is calibrated to historical data, and a linear regression model for each horizon is estimated from the data as follows:

$$z(t+k) = a_k * z(t-1) + b_k * z(t) \quad (3)$$

where t is the current time period, t+k is a forecast time period and t−1 is a prior time period, and where $a_k$ and $b_k$ are regression coefficients relating to price in the prior time period and the current time period, respectively. Coefficients $a_k$ and $b_k$ are determined by running historical data points using a conventional regression model. The subscript. "k" for the coefficients denotes that the determined coefficients apply only for a given forecast horizon (t+k). Thus, if a different horizon is selected, the coefficients would be to be determined again for that selected horizon. The standard error of the regression is used to construct uncertainty ranges around the forecast. The asterisk symbol "*" simply denotes a multiplier function.

The present invention is a method and system for creating a refined price-forecasting tool that takes into account capacity utilization data, in addition to the price parameters of the Co-pending Patent Application. Capacity utilization data for various industries is publicly available over various periods. By including this data, the refined price-forecasting tool takes into account industrial dynamics of the industry being analyzed that underlie pricing factors.

Two new predictor variables are defined regarding capacity utilization, based on observations of capacity utilization history. First, the term "u" is defined as:

$$u = N_L / N_T, \quad (4)$$

where $N_L$ is the number of months in which utilization has been lower than the current level of utilization and $N_T$ is the total number of months in the sample history. Then the new predictor variables are defined as:

$$u\_high(t) = \max[0, u(t) - 0.5], \text{ and} \quad (5)$$

$$u\_low(t) = \max[0, 0.5 - u(t)] \quad (6)$$

Including the above predictor variables in equation (3), the new model formulation for each forecast horizon is then formulated as:

$$z(t+k) = a_k * z(t-1) + b_k * z(t) + c_k * u\_high(t) + d_k * u\_low(t) \quad (7)$$

where $c_k$ and $d_k$ are regression coefficients relative to high and low capacity utilization in the current time period with respect to the time horizon (t+k).

Similar to what was discussed above with respect to equation 3, historical price and utilization data may be run on a standard regression model using equation 7 to estimate the coefficients a, b, c and d for the time horizon (t+k). As in any regression model, significance tests are performed to test whether or not each predictor should be kept or discarded. Once the model is constructed as such, the process for generating price forecasts and scenarios is the same as described above.

Figure 1:
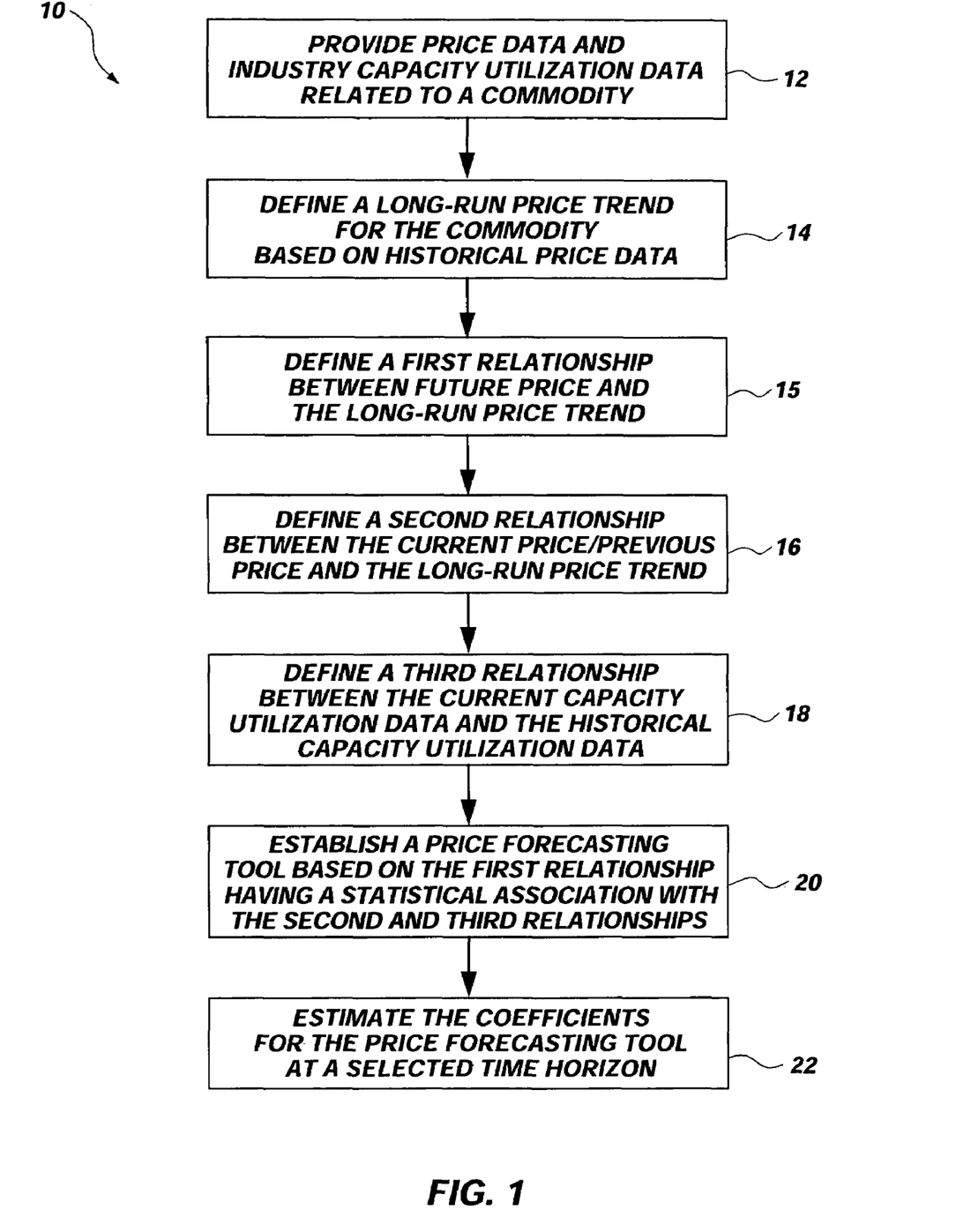
FIG. 1 is a high-level flow chart of a method of creating a price forecasting tool in accordance with an embodiment of the present invention.

Referring to FIG. 1, the process for creating a price forecast tool as described above is shown in flow chart 10. At step 12, data is provided regarding the price and the industry capacity utilization for a given commodity. At step 14, a long-run price trend is defined for the commodity based on the historical price data. Alternately, industry forecasts of price data, instead of historical price data, may be used. An example might be the selection of data forecasting the projected rate of average price change over a period of time.

Next, at step 15, a first relationship is defined between future price and long-run trend price. This step makes reference to replacing the left hand side of equation (7) with the log normal relationship given in equation (2). Thus, for the left hand side of equation (7), the term z(t+k) becomes LN [(price (t+k)]−LN[trend price(t+k)]

Then, at step 16, a second relationship is defined as a pair of relationships between the current price and the long-run price trend and between the price in a previous period and the long-run price trend. Thus, on the right hand side of equation (7), the first two terms relating to the price at a previous time period and the the price at a current time period are replaced by the equivalent terms from equation (2). Accordingly, the term $a_k * z(t-1)$ becomes $a_k * LN$ [(price(t−1)]−LN[trend price(t−1)] and the term $b_k * z(t)$ becomes $b_k * LN$ [(price(t)]−LN [trend price(t)].

Then at step 18, a third relationship is defined between the current capacity utilization data and historical capacity utilization data. Accordingly, the third and fourth terms in equation (7) are replaced by the equivalent terms from equations (4), (5) and (6). Thus, the term $c_k*u\_high(t)$ is replaced by $c_k*\max[0, N_L/N_T-0.5]$ and the term $d_k*u\_low(t)$ is replaced by $d_k*\max[0, 0.5-N_L/N_T]$ At step 20, a price-forecasting tool is established based on the first relationship having a statistical association or relationship with the second and third relationships. Thus, equation (7) now has the following form, showing these relationships:

$$\mathrm{LN}[(\text{price}(t+k)]-\mathrm{LN}[\text{trend price}(t+k)]=a_k*\{\mathrm{LN}[(\text{price}(t-1)]-\mathrm{LN}[\text{trend price}(t-1)]\}+b_k*\{\mathrm{LN}[(\text{price}(t)]-\mathrm{LN}[\text{trend price}(t)]\}+c_k*\{\max[0,N_L/N_T-0.5]\}+d_k*\{\max[0,0.5-N_L/N_T]\} \quad (8)$$

Then at step 22, equation (8) is run in a statistical linear regression process, using historical data to estimate the values of coefficients $a_k$, $b_k$, $c_k$, and $d_k$ for a given time horizon k. In other words, these coefficients are estimated for the price-forecasting tool according to the statistical association between the first relationship and the second and third relationships for a horizon k. Thus, the coefficients are estimated by using regression models, based on the historical price and utilization data and the current model exemplified by equation (8) derived from equation (7).

For example, suppose the time horizon k is chosen to be three months and historical data is available going back five years. Equation (8) would be used to run numerous iterations of the five years of historical data, selecting different three month intervals, in order to estimate coefficients that would approximately balance the left and right hand sides of equation (8). When this process has been completed, then the coefficients would have been determined for a three-month horizon. If a different time period or horizon is needed, such as six months, a new regression process would need to be run to estimate different coefficients that would be applicable for the new horizon.

Figure 2:
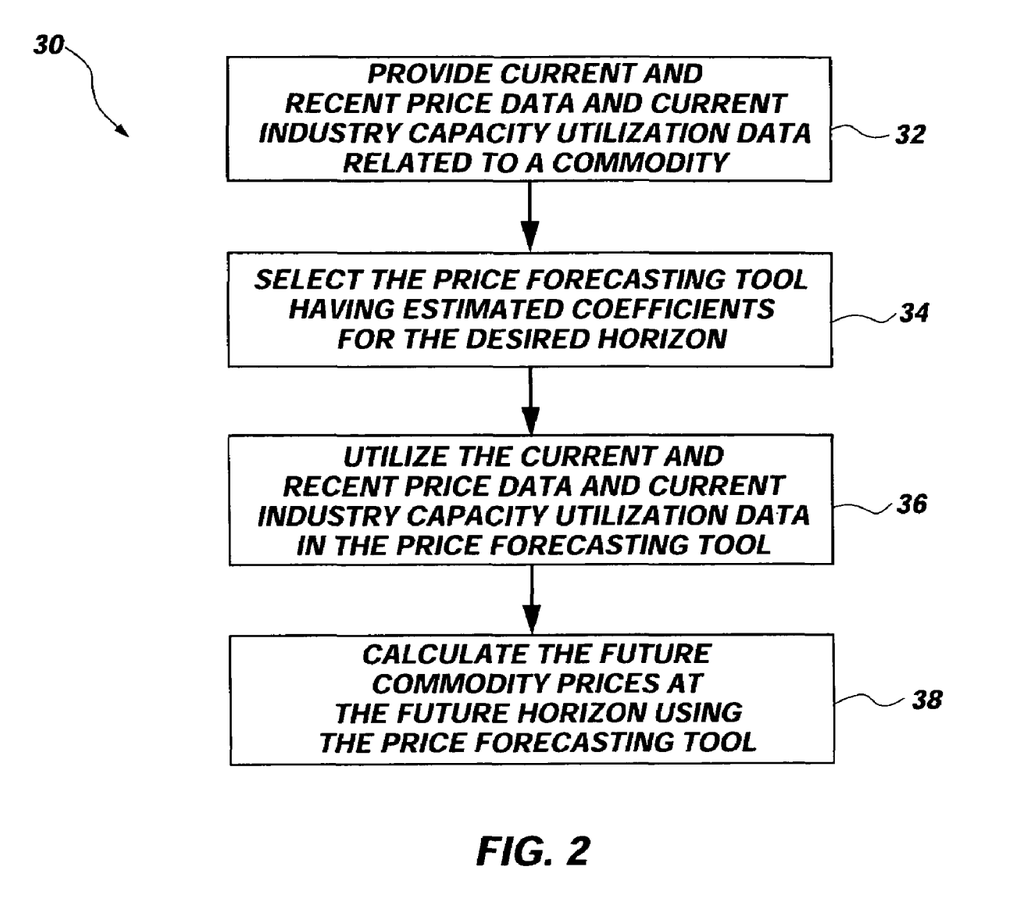
FIG. 2 is a high-level flow chart of a method of utilizing the price forecasting tool of FIG. 1, in accordance with an embodiment of the present invention.

Once the coefficients have been obtained for a given horizon, the price forecasting tool is ready for use on a computer. FIG. 2 is a flow chart showing a process 30 for utilizing the price forecasting tool created according to the process shown in FIG. 1 to forecast one or more future prices for a commodity using a computer. First, at step 32, current and recent price data and current industry capacity utilization data are provided relative to the commodity. Then at step 34, a price forecasting tool is selected that has estimated coefficients for a desired horizon. Then, at step 36, the current and recent price data and current industry capacity utilization data at injected into equation (8), the price forecasting tool, having the estimated coefficients for that horizon. Finally, at step 38, the future commodity prices are calculated at the selected future horizon by solving equation (8) for price (t+k).

It is understood that short-term and long-term time horizons can be applied to determine short-term and long-term forecasts, as desired. In the event that one or more of the regression-determined coefficients are negligible, compared to the other coefficients, that associated term in the equation may be minimized or deleted.

ADVANTAGES

One advantage of the present invention is a reduction in model forecast error. By implementing capacity utilization predictors, as well as price predictors, forecast error has been found to be significantly reduced.

Another advantage of the present invention is that it provides an option to develop price forecasts based on market expert beliefs about future industry states. Though the model does not forecast capacity utilization, it can generate price forecasts using any input assumption for a current utilization level. Thus, if a user has a strong belief that capacity utilization will increase or decrease by an expected amount within the next six months, this belief could be directly captured in the model input for current utilization. This approach enables the model of the present disclosure to integrate historical information (from the regressions), current information (from current pricing inputs) and beliefs about future market developments (from utilization projection data).

DRAM Application

Figure 3:
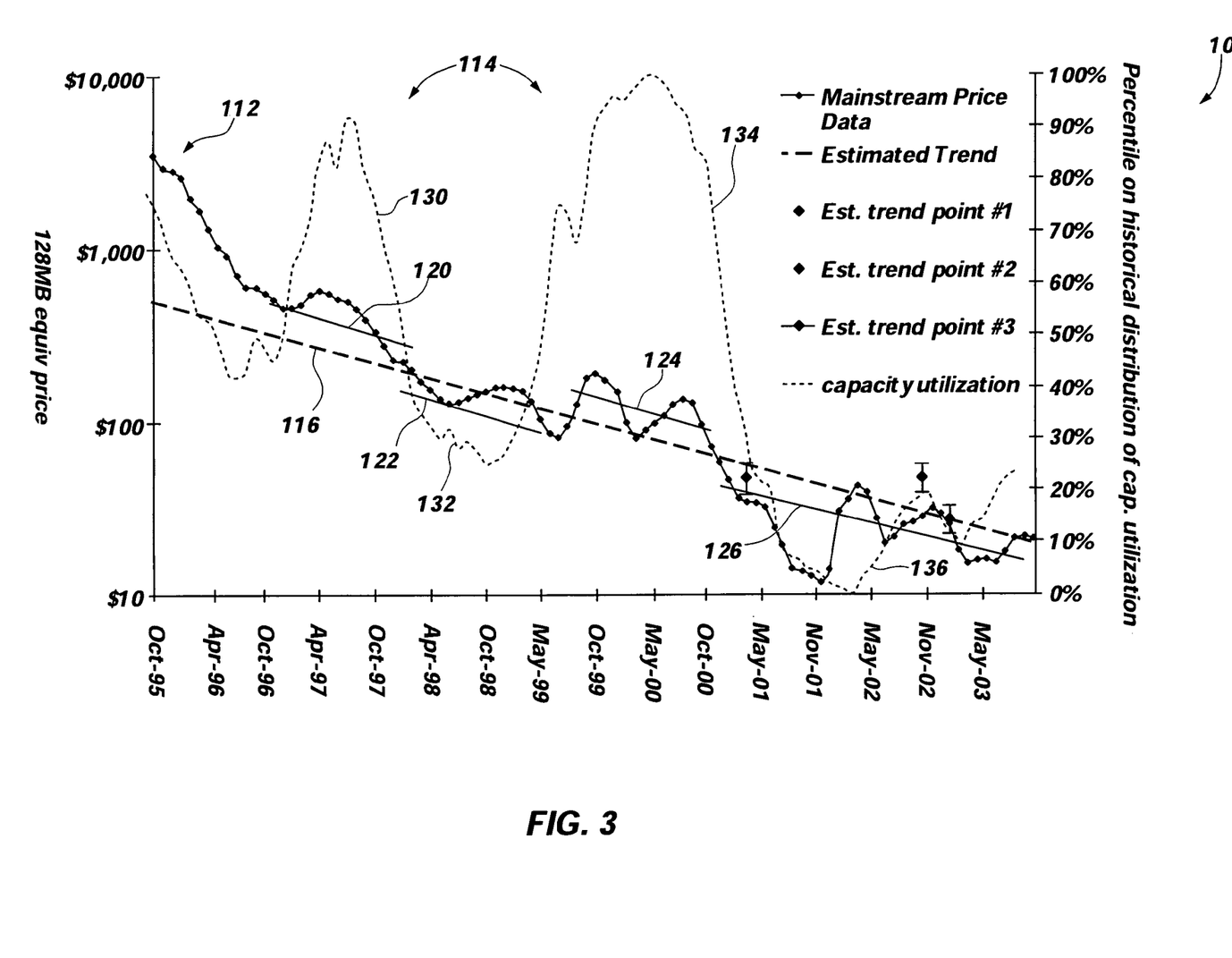
FIG. 3 is a graph of a long-run average price trend line relative to industry capacity utilization for a commodity, according to the present invention.

In one embodiment of the current disclosure, the subject model is used to forecast prices of dynamic random access memory (DRAM) devices. Referring to FIG. 3, a graph 100 is shown that plots a history of DRAM prices 112 and capacity utilization percentiles 114. The utilization percentiles 114 are based on the distribution of capacity utilization percentages over the 1993-2003 time period. A long-run price trend line 116 shows the average or mean price over the same time period.

Short-term price trend lines are drawn to show short-term oscillation of prices. For example, during the period of about October 1996 to October 1997, a short-term trend line 120 shows a price trend above the long-run price trend line 116. Similarly, during the period of about April 1998 to April 1999, a short-term trend line 122 shows a price trend above the long-run trend line 116. Similar short-term price trend lines 124 and 126 are also shown for other time periods.

One can see that, in periods of relatively high utilization, such as during peaks 130 and 134, prices tend to oscillate around a short-term trend lines 120 and 124, respectively, which are at levels above the long-run trend line 116. Conversely, in periods of relatively low utilization, such as during troughs 132 and 136, prices tend to oscillate around short-term trend lines 122 and 126, which are at levels below the long-run trend line 116.

As indicated above, a regression model is run on the historical data shown in FIG. 3 to estimate parameters a, b, c and d for the DRAM price-utilization model. Reference is made to the Co-pending Patent Application for more detail regarding the procedure involved in estimating these coefficients.

Figure 4:
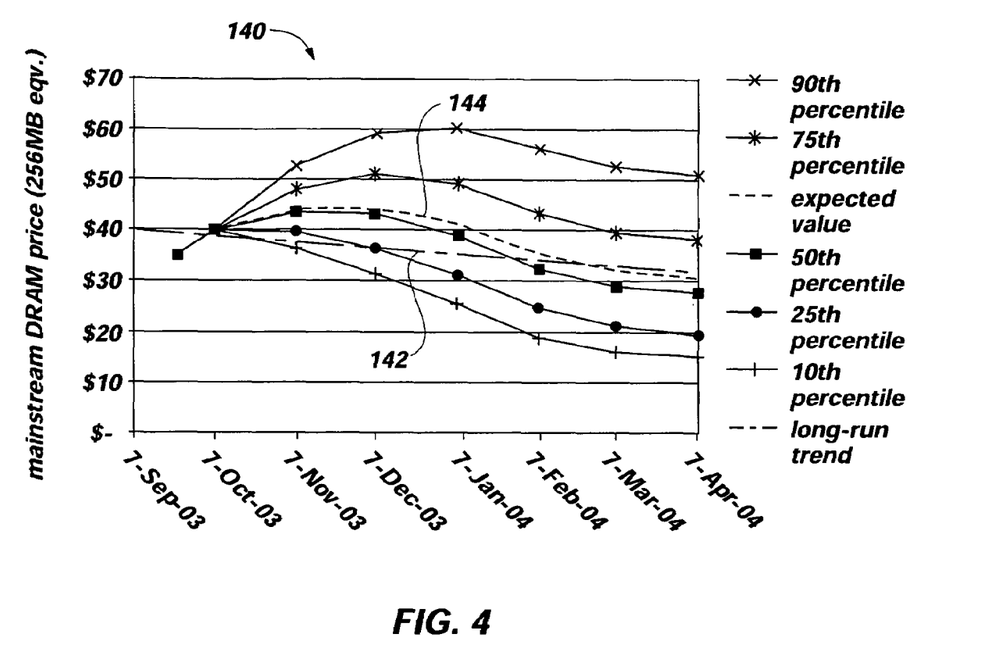
FIGS. 4 and 5 are graphs showing price forecasting projections for a DRAM commodity using an embodiment of a price-forecasting tool according to the present invention.
Figure 5:
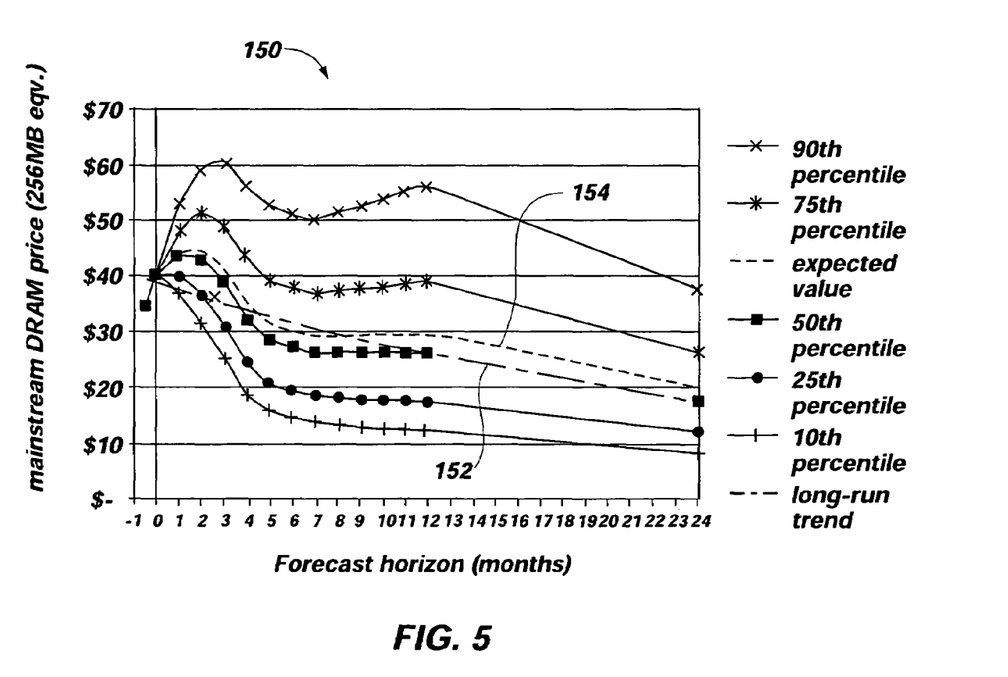

Once the coefficients are estimated, a forecast of future DRAM prices may be made using equation (7) in the form shown in equation (8). FIGS. 4 and 5 represent short-term and long-term forecasts, respectively, based on the following current and recent DRAM price and utilization data, as well as prior historical percentiles, as follows:

Inputs

| | |
|---|---|
| Current contract price (mainstream DRAM, 256 MB eqv.) | $40.00 |
| Contract price two weeks ago (mainstream DRAM, 256 MB eqv.) | $35.00 |
| Most recent semiconductor capacity utilization data | 73% |
| Current date | Oct. 7, 2003 |

| Current Key Indicators | Value | Historical Distribution Percentile |
|---|---|---|
| Price/long-run trend ratio | 1.04 | 65% |
| Price change, two weeks | 14% | 96% |
| Capacity utilization | 73% | 24% |

FIG. 4 shows a short-term six-month price forecast graph 140 for the period of Oct. 7, 2003 to Apr. 7, 2004, using equation 7 and the inputs and key indicators given above. Note that expected long-run trend line 142 starts at about $40 in October 2003 and drops gradually to about $32 by April 2004. The expected short-term price line 144 shows an increase from $40 to about $45 during the first two months, thereafter dropping back to coincide with the long-run trend line 142 after about February 2004. This temporary price increase of $5 (12.5%) is a substantial shift in pricing that could be invaluable in business planning over the six-month period in question.

FIG. 5 shows a long-term 24-month price forecast graph 50 for the period of October 2003 to October 2005, using equation 7 and the inputs and key indicators given above. During this two-year period, the expected long-run trend line 152 starts at about $40 in the first month and drops steadily to about $18 by October 2005. The expected long-term price line 154 shows an increase from $40 to about $45 during the first two months, followed by a drop back to just below the long-run trend line 152 at about the sixth month. Thereafter, the expected long-term price line 154 rises about $3 above the trend line 152 and gradually descends roughly in parallel with the long-term trend line 152 to about $20 in February 2004. Again, these fluctuations of the expected price line 154 above and below the long-term trend line 152 can be invaluable in business planning scenarios.

Figure 6:
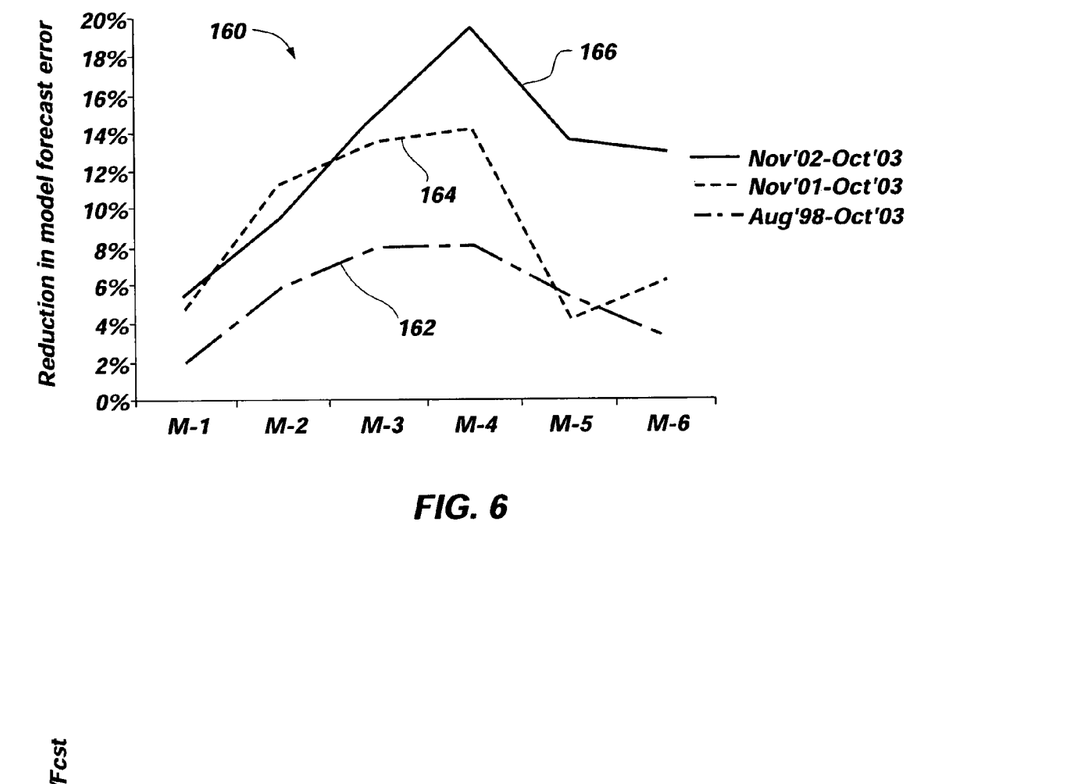
FIGS. 6 and 7 are graphs showing reductions in forecast error using the price-forecasting tool of FIGS. 4 and 5.
Figure 7:
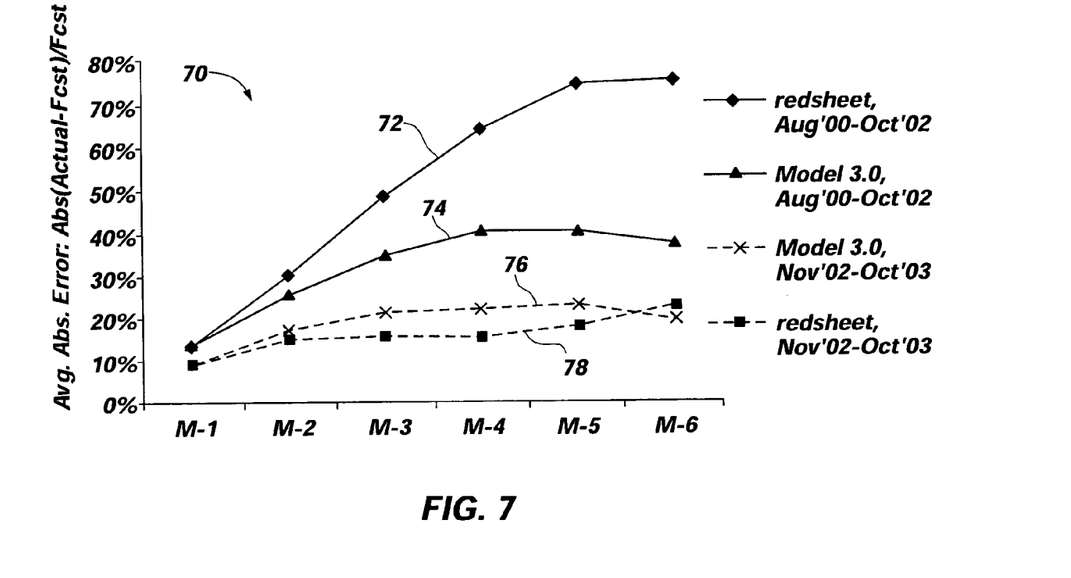

FIGS. 6 and 7 show that the model using the price and capacity utilization predictors of the present disclosure has provided a substantial reduction in price forecast error over prior forecasting methods with respect to the embodiment of DRAM prices and DRAM industry utilization described above. FIG. 5 shows that short-term model forecast errors have been reduced by roughly an average of 5% to 15%. Graph 160 includes three lines showing the percentage of reduction in model forecast error for different periods. Line 162 shows a reduction in error fluctuating from 2% to about 6% during the period of August 1998 to October 2003. Line 164 shows a greater reduction in error for the period of November 2001 to October 2003, between 4% and 14%. Line 166 covers a one-year period from November 2002 to October 2003, with a reduction in error ranging from 6% to a peak of about 20%.

FIG. 7 is a graph 170 depicting the average error in forecasting for the same periods of time, comparing the current forecasting method relative to expert forecasting. Line 172 shows the amount of error for the period of August 2000 to October 2002 using an old market expert forecasting process. The error ranges from 12% to as high as 80%. Using the model of the present disclosure, line 174 shows that the amount of error for the same period ranged from 12% to about 40%. For a more recent period of November 2002 to October 2003, line 176 shows that the absolute error was even lower, ranging from about 10% to about 20%, with an average of around 18%. It is also interesting to note that line 178, representing a combination of the model of the present disclosure and expert forecasting dropped the error amount even lower, ranging from 10% to about 20%, but with an average of around 14%. Thus, the current model together with personal expert forecasting in combination provides a slightly better result than the model by itself. However, the model by itself results in an improvement of about 100% over using expert forecasting by itself.

A method and system for creating a price forecasting tool has been disclosed. By utilizing the method and system in accordance with the present invention, a separate statistical model is developed for each forecast horizon, rather than developing a single period model that is the run through simulations to develop longer term forecast distributions. Consequently, the method and system in accordance with the present invention is particularly well suited to commodities that show both strong momentum in the short-term and reversion to a trend line in the long-term. Further, the utilization of industry capacity utilization data significantly reduces the error in the forecasting model.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A method of creating a price forecasting tool for a commodity, comprising:
   (a) providing to a computer price data related to the commodity, wherein a relationship between types of price data is defined by the equation:
   $z(t+k)=LN[price(t+k)]-LN[trend\ price(t+k)]$, where LN denotes the natural log function, price(t+k) is a future price at a future time horizon (t+k) and trend price(t+k) is a trend price at the future time horizon (t+k);
   (b) providing to a computer industry capacity utilization data related to the commodity;
   (c) establishing the price forecasting tool based on a statistical relationship between the price data and the industry capacity utilization data for a given time horizon; and
   (d) using the computer to forecast the price of the commodity based on the established price forecasting tool.

2. The method of claim 1, wherein the step of providing the price data includes providing historical and current price data and wherein the step of providing the industry capacity utilization data includes providing historical and current industry capacity utilization data.

3. The method of claim 2, wherein the step of establishing the price forecasting tool comprises defining a long-run price trend based on selected price data.

4. The method of claim 3, wherein the selected price data is historical price data.

5. The method of claim 3, wherein the selected price data is future price data based on industry price forecasts.

6. The method of claim 3, wherein the step of establishing the price forecasting tool comprises defining a first relationship between a future price and the long-run price trend.

7. The method of claim 6, wherein the step of establishing the price forecasting tool further comprises defining a second relationship as a pair of relationships between the long-run price trend and a current price, and between the long-run price trend and a previous period price.

8. The method of claim 7, wherein the step of establishing the price forecasting tool comprises defining a long-run industry capacity utilization trend based on the historical industry capacity utilization data.

9. The method of claim 8, wherein the step of establishing the price forecasting tool comprises defining a third relationship between the long-run industry capacity utilization trend and the current industry capacity utilization.

10. The method of claim 9, wherein the step of establishing the price forecasting tool comprises basing the price forecasting tool on a statistical relationship between the first relationship and second and third relationships.

11. The method of claim 10, wherein the step of defining the third relationship comprises running the price forecasting tool through a linear regression process using the historical price data and historical industry capacity utilization data.

12. The method of claim 11, wherein the step of running the price forecasting tool through a linear regression process comprises deriving at least one coefficient for the second and/or third relationships to balance the first relationship with the second and third relationship for a selected time horizon.

13. A method of creating a price forecasting tool for a commodity comprising:
    (a) providing to a computer historical and current price data and historical and current industry capacity utilization data related to the commodity;
    (b) defining a first relationship on the computer between a future price and a long-run price trend, wherein the first relationship is defined by the equation: $z(t+k)=LN[\text{price}(t+k)]-LN[\text{trend price}(t+k)]$, where LN denotes the natural log function, price(t+k) is the future price at a time horizon (t+k) and trend price(t+k) is the trend price at the future time horizon (t+k);
    (c) defining a second relationship on the computer as a pair of relationships between the historical price data and the current price data, and between the historical price data and a previous period price data;
    (d) defining a third relationship on the computer between the historical industry capacity utilization data and the current industry capacity utilization data;
    (e) establishing the price forecasting tool as a statistical relationship between the first relationship and the second and third relationships; and
    (f) using the computer to forecast the price of the commodity based on the established price forecasting tool.

14. A method of creating a price forecasting tool for a commodity, comprising:
    (a) providing to a computer price data relating to the commodity for estimation of a regression coefficient $a_k$ and a regression coefficient $b_k$, wherein $a_k$ and $b_k$ are related to price in a prior time period (t−1) and a current time period (t), respectively, for a given time horizon (t+k);
    (b) providing to a computer industry capacity utilization data related to the commodity for estimation of a regression coefficient $c_k$ and a regression coefficient $d_k$, wherein $c_k$ and $d_k$ are related to high and low industry capacity utilization in the current time period with respect to the given time horizon (t+k); and
    (c) forecasting a future price of the commodity on a computer utilizing the equation:
    $z(t+k)=a_k*z(t-1)+b_k*z(t)+c_k*u\_high(t)+d_k*u\_low(t)$
    where t is the current time period, t+k is the forecast time period and t−1 is the prior time period, where $z(t+k)=LN[(\text{price}(t+k)]-LN[\text{trend price}(t+k)]$, where LN denotes natural log function, price(t+k) is a future price at the selected horizon (t+k) and trend price(t+k) is a future trend price at horizon (t+k), $z(t-1)=LN[(\text{price}(t-1)]-LN[\text{trend price}(t-1)]$, price (t−1) is a price in a previous time period and trend price (t−1) is a trend price in a previous time period, where $z(t)=LN[(\text{price}(t)]-LN[\text{trend price}(t)]$, price (t) is a price in a current time period and trend price (t) is a trend price in a current time period, where u is defined as: $u=N_L/N_T$, where $N_L$ is number of months in which utilization has been lower than a current level of utilization and $N_T$ is total number of months in the sample history, and where $u\_high(t)=\max[0, u(t)-0.5]$, and $u\_low(t)=\max[0, 0.5-u(t)]$.

15. The method of claim 14, wherein $a_k$, $b_k$, $c_k$ and $d_k$ are estimated by utilizing linear regression techniques and historical price and industry capacity utilization data.

16. A computer readable medium comprising computer-executable instructions for creating a price forecasting tool for a commodity by:
    (a) providing price data related to the commodity, wherein a relationship between types of price data is defined by the equation:
    $z(t+k)=LN[\text{price}(t+k)]-LN[\text{trend price}(t+k)]$, where LN denotes the natural log function, price(t+k) is a future price at a future time horizon (t+k) and trend price(t+k) is a trend price at the future time horizon (t+k);
    (b) providing industry capacity utilization data related to the commodity; and
    (c) third means for establishing the price forecasting tool based on a statistical relationship between the price data and the industry capacity utilization data.

17. The system according to claim 16, wherein the first means provides current and historical price data related to the commodity.

18. The system according to claim 17, wherein a long-term price trend is established using the historical price data.

19. The system according to claim 18, wherein a first relationship is established between a future price and a long-run price trend.

20. The system according to claim 19, wherein a second relationship is established by a pair of relationships between the current price data and the long-term price trend, and between a previous period price data and the long-term price trend.

21. The system according to claim 20, wherein the industry capacity utilization data comprises historical industry capacity utilization data and current industry capacity utilization data.

22. The system according to claim 21, wherein a third relationship is established between the historical industry capacity utilization data and the current industry capacity utilization data.

23. The system according to claim 22, wherein a statistical relationship is established between the first relationship and the second and third relationships.

24. The system according to claim 16, wherein the first means provides current price data, previous period price data, and price forecast data related to the commodity.

25. A computer readable medium comprising computer-executable instructions for creating a price forecasting tool for a commodity by:
    (a) estimating a regression coefficient $a_k$ and a regression coefficient $b_k$, wherein $a_k$ and $b_k$ are related to price in a prior time period (t−1) and a current time period (t), respectively, for a given time horizon (t+k);
    (b) estimating a regression coefficient $c_k$ and a regression coefficient $d_k$, wherein $c_k$ and $d_k$ are related to high and low industry capacity utilization in the current time period with respect to the given time horizon (t+k); and
    (c) forecasting a future price of the commodity by utilizing the equation:
    $$z(t+k)=a_k*z(t-1)+b_k*z(t)+c_k*u\_high(t)+d_k*u\_low(t)$$
    where t is the current time period, t+k is the forecast time period and t−1 is the prior time period, where $z(t+k)=LN[(\text{price}(t+k)]-LN[\text{trend price}(t+k)]$, where LN denotes natural log function, price(t+k) is a future price at the selected horizon (t+k) and trend price(t+k) is a future trend price at horizon (t+k), $z(t-1)=LN[(\text{price}(t-1)]-LN[\text{trend price}(t-1)]$, price (t−1) is a price in a previous time period and trend price (t−1) is a trend price in a previous time period, where $z(t)=LN[(\text{price}(t)]-LN[\text{trend price}(t)]$, price (t) is a price in a current time period and trend price (t) is a trend price in a current time period, and where u is defined as: $u=N_L/N_T$, where $N_L$ is number of months in which utilization has been lower than the current level of utilization and $N_T$ is total number of months in the sample history, and where $u\_high(t)=\max[0, u(t)-0.5]$, and $u\_low(t)=\max[0, 0.5-u(t)]$.

26. A method of creating a price forecasting tool for a commodity comprising:
 (a) providing to a computer historical and current price data and historical and current industry capacity utilization data related to the commodity;
 (b) defining a first relationship on the computer between a future price and a long-run price trend;
 (c) defining a second relationship on the computer as a pair of relationships between the historical price data and the current price data, and between the historical price data and a previous period price data, wherein the second relationship is defined by the equations: $z(t-1)=LN[price(t-1)]-LN[trend\ price(t-1)]$, and $z(t)=LN[price(t)]-LN[trend\ price(t)]$ where LN denotes the natural log function, price(t−1) is the price at a previous time period (t−1) and trend price(t−1) is the trend price at the previous time period (t−1), and where price(t) is the price at a current time period (t) and trend price(t) is the trend price at the current time period (t);
 (d) defining a third relationship on the computer between the historical industry capacity utilization data and the current industry capacity utilization data; and
 (e) establishing the price forecasting tool as a statistical relationship between the first relationship and the second and third relationships; and
 (f) using the computer to forecast the price of the commodity based on the established price forecasting tool.

27. A method of creating a price forecasting tool for a commodity comprising:
 (a) providing to a computer historical and current price data and historical and current industry capacity utilization data related to the commodity;
 (b) defining a first relationship on the computer between a future price and a long-run price trend;
 (c) defining a second relationship on the computer as a pair of relationships between the historical price data and the current price data, and between the historical price data and a previous period price data;
 (d) defining a third relationship on the computer between the historical industry capacity utilization data and the current industry capacity utilization data, wherein the third relationship is defined by the following equations: $u\_high(t)=\max[0, u(t)-0.5]$, and $u\_low(t)=\max[0, 0.5-u(t)]$, where $u=N_L/N_T$, $N_L$ is the number of months in which utilization has been lower than the current level of utilization and $N_T$ is the total number of months in the sample history;
 (e) establishing the price forecasting tool as a statistical relationship between the first relationship and the second and third relationships; and
 (f) using the computer to forecast the price of the commodity based on the established price forecasting tool.

28. A method in accordance with claim 13, further comprising providing forecast price data, previous period price data and current price data relating to the commodity.

29. A method in accordance with claim 1, wherein the industry capacity utilization data comprises a historical industry capacity utilization data and a current industry capacity utilization data, and wherein a second relationship is defined by the following equations: $u\_high(t)=\max[0, u(t)-0.5]$, and $u\_low(t)=\max[0, 0.5-u(t)]$, where $u=N_L/N_T$, $N_L$ is the number of months in which utilization has been lower than the current level of utilization and $N_T$ is the total number of months in the sample history.

30. A method in accordance with claim 1, wherein the price data related to the commodity comprises historical and current price data, and a future price and a long-run price trend.

31. A method in accordance with claim 30, wherein the long-term price trend is established using the historical price data.

32. A method in accordance with claim 30, further comprising establishing a second relationship by a pair of relationships between the current price data and the long-term price trend, and between a previous period price data and the long-term price trend.

33. A method in accordance with claim 32, further comprising establishing a statistical relationship is established between the first relationship and the second relationship.

34. A method in accordance with claim 1, further estimating a regression coefficient $a_k$ and a regression coefficient $b_k$, wherein $a_k$ and $b_k$ are related to price in a prior time period (t−1) and a current time period (t), respectively, for a given time horizon (t+k).

35. A method in accordance with claim 34, flirt her comprising estimating a regression coefficient $c_k$ and a regression coefficient $d_k$, wherein $c_k$ and $d_k$ are related to high and low industry capacity utilization in the current time period with respect to the given time horizon (t+k).

36. A method in accordance with claim 35, flirt her comprising forecasting a future price of the commodity by utilizing the equation: $z(t+k)=a_k*z(t-1)+b_k*z(t)+c_k*u\_high(t)+d_k*u\_low(t)$ where t is the current time period, t+k is the forecast time period and t−1 is the prior time period, where $z(t+k)=LN\ [(price(t+k)]-LN[trend\ price(t+k)]$, where LN denotes natural log function, price(t+k) is a future price at the selected horizon (t+k) and trend price(t+k) is a future trend price at horizon (t+k), $z(t-1)=LN\ [(price(t-1)]-LN[trend\ price(t-1)]$, price (t−1) is a price in a previous time period and trend price (t−1) is a trend price in a previous time period, where $z(t)=LN\ [(price(t)]-LN[trend\ price(t)]$, price (t) is a price in a current time period and trend price (t) is a trend price in a current time period, and where u is defined as: $u=N_L/N_T$, where $N_L$ is number of months in which utilization has been lower than the current level of utilization and $N_T$ is total number of months in the sample history, and where $u\_high(t)=\max[0, u(t)-0.5]$, and $u\_low(t)=\max[0, 0.5-u(t)]$.

37. A method in accordance with claim 1, further comprising estimating a regression coefficient $c_k$ and a regression coefficient $d_k$, wherein $c_k$ and $d_k$ are related to high and low industry capacity utilization in the current time period with respect to the given time horizon (t+k).

38. A method of creating a price forecasting tool for a commodity, comprising:
 (a) providing to a computer price data related to the commodity, wherein a relationship between types of price data is defined by the equation:
  $z(t-1)=LN[price(t-1)]-LN[trend\ price(t-1)]$, and $z(t)=LN[price(t)]-LN[trend\ price(t)]$ where LN denotes the natural log function, price(t−1) is the price at a previous
  time period (t−1) and trend price(t−1) is the trend price at the previous time period (t−1), and where price(t) is the price at a current time period (t) and trend price(t) is the trend price at the current time period (t);
 (b) providing to a computer industry capacity utilization data related to the commodity;
 (c) establishing the price forecasting tool based on a statistical relationship between the price data and the industry capacity utilization data for a given time horizon; and
 using the computer to forecast the price of the commodity based on the established price forecasting tool.

* * * * *

UNITED STATES PATENT AND TRADEMARK OFFICE
CERTIFICATE OF CORRECTION

PATENT NO. : 7,693,801 B2
APPLICATION NO.: 10/831591
DATED : April 6, 2010
INVENTOR(S) : Thomas Olavson It is certified that error appears in the above-identified patent and that said Letters Patent is hereby corrected as shown below:

In column 10, line 8, in Claim 16, before "establishing" delete "third means for".

In column 11, line 22, in Claim 26, alter "data;" delete "and".

In column 12, line 17, in Claim 35, delete "flirt her" and insert -- further --, therefor.

In column 12, line 22, in Claim 36, delete "flirt her" and insert -- further --, therefor.

Signed and Sealed this

Twenty-third Day of November, 2010

David J. Kappos
*Director of the United States Patent and Trademark Office*

CERTIFICATE OF CORRECTION (continued)
U.S. Pat. No. 7,693,801 B2

In column 12, lines 50-57, in Claim 38, delete
"z(t-1)=LN[price(t-1)]-LN[trend price(t-1)], and
z(t)=I.N[price(t)]-LN[trend price(t)] where LN denotes
the natural log function, price(t-1) is the price at a previous
time period (t-1) and trend price(t-1) is the trend price
at the previous time period (t-1), and where price(t) is
the price at a current time period (t) and trend price(t)
is the trend price at the current time period (t);"
and insert --
z(t-1)=LN[price(t-1)]-LN[trend price(t-1)], and
z(t)=LN[price(t)]-LN[trend price(t)] where LN denotes
the natural log function, price(t-1) is the price at a previous time period (t-1) and trend price(t-1) is the trend
price at the previous time period (t-1), and where price(t)
is the price at a current time period (t) and trend price(t)
is the trend price at the current time period (t); --, therefor.